United States Patent
Nieczyporowicz et al.

(10) Patent No.: US 6,724,741 B1
(45) Date of Patent: *Apr. 20, 2004

(54) PN CODE SELECTION FOR SYNCHRONOUS CDMA

(75) Inventors: Leon Nieczyporowicz, West Jordan, UT (US); Thomas Giallorenzi, Herriman, UT (US); Steven B Perkins, Sandy, UT (US)

(73) Assignee: L-3 Communications Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/328,546

(22) Filed: Jun. 9, 1999

Related U.S. Application Data

(60) Provisional application No. 60/091,070, filed on Jun. 29, 1998.

(51) Int. Cl.⁷ .......................... H04B 7/216; H04J 11/00
(52) U.S. Cl. ...................................... 370/335; 370/203
(58) Field of Search .................. 370/335, 342, 370/203–210; 708/410; 375/130–150

(56) References Cited

U.S. PATENT DOCUMENTS

| | | | |
|---|---|---|---|
| 5,151,919 A | 9/1992 | Dent | 375/1 |
| 5,204,876 A | 4/1993 | Bruckert et al. | 375/1 |
| 5,329,547 A | 7/1994 | Ling | 375/1 |
| 5,418,813 A | 5/1995 | Schaffner et al. | 375/205 |
| 5,442,625 A | 8/1995 | Gitlin et al. | 370/18 |
| 5,515,396 A | 5/1996 | Dalekotzin | 375/206 |
| 5,548,613 A | 8/1996 | Kaku et al. | 375/208 |
| 5,659,573 A | 8/1997 | Bruckert et al. | 375/200 |
| 5,729,124 A | 3/1998 | Lu | 324/76.24 |
| 5,748,668 A | 5/1998 | Tomita et al. | 375/200 |
| 5,751,761 A | 5/1998 | Gilhousen | 375/200 |
| 5,757,767 A | 5/1998 | Zehavi | 370/208 |
| 5,805,567 A | 9/1998 | Ramesh | 370/204 |
| 5,805,584 A | 9/1998 | Kingston et al. | 370/342 |
| 5,825,835 A | 10/1998 | Kingston et al. | 375/367 |
| 5,851,187 A | 12/1998 | Thomas, III et al. | 600/447 |
| 5,864,548 A | 1/1999 | Liu | 370/320 |
| 5,936,972 A | 8/1999 | Meidan et al. | 371/20.1 |
| 6,091,760 A * | 7/2000 | Giallorenzi et al. | 370/342 |
| 6,091,761 A * | 7/2000 | Popovic | 375/142 |

OTHER PUBLICATIONS

"On The Transmission Of Walsh Modulated Multiplex Signals", Hubner H., Applications Of Walsh Functions, 1970 Proceedings, pp. 41–45.

"Analog And Digital Multiplexing By Means Of Walsh Functions", Hubner, H., Applications Of Walsh Functions, 1970 Proceedings, pp. 238–247.

Multiplexing Of Telephone Signals By Walsh Functions, Davidson, I.A., Applications Of Walsh Functions, 1971 Proceedings, Apr. 13, 1971, pp. 177–179.

"Multiplex Systems Using Sums of Walsh Functions As Carriers", Hubner, H., Applications Of Walsh Functions, 1971 Proceedings, Apr. 13, 1971, pp. 180–191.

"The Use Of Walsh Functions For Multiplexing Signals", Davidson, I.A., Applications Of Walsh Functions, 1970 Proceedings, pp. 23–25.

* cited by examiner

Primary Examiner—Steven Nguyen
(74) Attorney, Agent, or Firm—Perman & Green, LLP

(57) ABSTRACT

A method for improving the spectral properties of a PN codeset for use in channels of a synchronous CDMA telecommunications system. The method includes steps of (a) providing a PN codeset matrix; and (b) reordering the columns of the PN codeset matrix in accordance with a reordering code. The method may further include the step of inverting at least one codeword of the reordered PN codeset in accordance with an inversion pattern, and may further include the step of selecting PN codes to optimize a subset of channels to operate in an asynchronous manner.

9 Claims, 5 Drawing Sheets

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$RC = \begin{bmatrix} 3 & 1 & 2 & 4 \end{bmatrix}$$

$$RH_4 = \begin{bmatrix} 1 & 1 & 1 & 1 \\ 1 & 1 & -1 & -1 \\ -1 & 1 & 1 & -1 \\ -1 & 1 & -1 & 1 \end{bmatrix}$$

$$Reordering\_code = [3 \quad 5 \quad 2 \quad 7 \quad 1 \quad 8 \quad 4 \quad 6]$$

$$Walsh\_code = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

$$Reordered\_code = \begin{bmatrix} 1 & 1 & 1 & 1 & 1 & 1 & 1 & 1 \\ 1 & 1 & -1 & 1 & 1 & -1 & -1 & -1 \\ -1 & 1 & 1 & -1 & 1 & -1 & -1 & 1 \\ -1 & 1 & -1 & -1 & 1 & 1 & 1 & -1 \\ 1 & -1 & 1 & -1 & 1 & -1 & 1 & -1 \\ 1 & -1 & -1 & -1 & 1 & 1 & -1 & 1 \\ -1 & -1 & 1 & 1 & 1 & 1 & -1 & -1 \\ -1 & -1 & -1 & 1 & 1 & -1 & 1 & 1 \end{bmatrix}$$

Inversion_pattern=

Reordered_code_w_inversion=

PN CODE SELECTION FOR SYNCHRONOUS CDMA

CLAIM OF PRIORITY FROM A COPENDING PROVISIONAL PATENT APPLICATION

Priority is herewith claimed under 35 U.S.C. §119(e) from copending Provisional Patent Application No. 60/091,070, filed Jan. 29, 1998, entitled "PN CODE SELECTION FOR SYNCHRONOUS CDMA", by Leon Nieczyporowicz, Thomas Giallorenzi and Steven Perkins. The disclosure of this Provisional Patent Application is incorporated by reference herein in its entirety.

FIELD OF THE INVENTION

This patent application relates generally to digital radio telecommunications systems and, in particular, to synchronous Code Division Multiple Access (CDMA) telecommunications that employ pseudonoise (PN) spreading codes, such as Hadamard or Walsh codes.

BACKGROUND OF THE INVENTION

In synchronous CDMA systems the PN codeset that is typically used to differentiate users is the Walsh set. However, the Walsh codeset has poor spectral properties and, as a result, it is desirable to provide some randomization of the codeset. It is known in the art to scramble the Walsh code by generating another PN code, i.e., a "cover code", of the same length as the Walsh code, and to then exclusive-OR (XOR) each code in the Walsh codeset with the cover code. However, this technique does not always provide the best improvement in the spectral properties of the Walsh codes used by the system.

General reference in this regard can be had to U.S. Pat. No. 5,751,761, entitled "System and Method for Orthogonal Spread Spectrum Sequence Generation in Variable Data Rate Systems", by K. S. Gilhousen.

OBJECTS OF THE INVENTION

It is an object of this invention to provide an improved technique for providing PN spreading codes for use in a CDMA radio telecommunications system.

It is another object of this invention to improve the performance and reliability of synchronous CDMA systems.

It is a further object of this invention to improve the spectral properties of a PN codeset for use in channels of a synchronous CDMA telecommunications system.

SUMMARY OF THE INVENTION

The foregoing and other problems are overcome and the objects of the invention are realized by methods and apparatus in accordance with embodiments of this invention.

A method in accordance with the teachings of this invention improves the spectral properties of a PN codeset, such as a Hadamard PN codeset, for use in channels of a synchronous CDMA telecommunications system. The method comprises steps of (a) providing the PN codeset matrix; and (b) reordering the columns of the PN codeset matrix in accordance with a reordering pattern. The method may further include the step of inverting at least one codeword of the reordered PN codeset in accordance with an inversion pattern, and may further include the step of selecting PN codes to optimize a subset of channels to operate in an asynchronous manner.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 illustrates an exemplary 8×8 Walsh code matrix, an exemplary reordering code, and the resultant reordered Walsh code matrix, in accordance with this invention.

FIG. 5 illustrates an exemplary inversion pattern for application to the reordered Walsh code matrix of FIG. 4, and the resultant inverted, reordered Walsh code matrix, in accordance with an aspect of this invention.

DETAILED DESCRIPTION OF THE INVENTION

Figure 1:
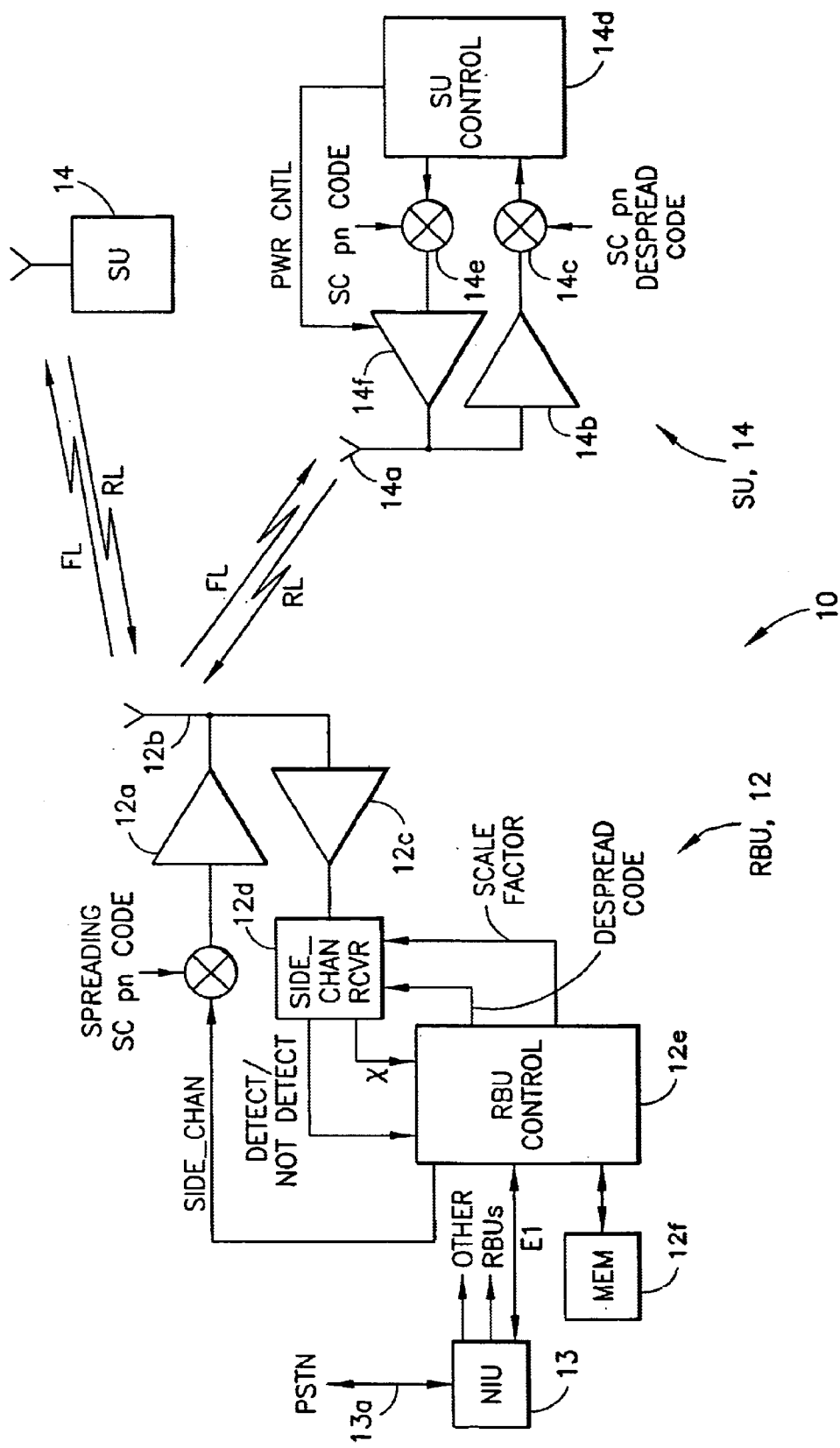
FIG. 1 is a simplified block diagram of a synchronous, spread spectrum CDMA fixed wireless communications system in accordance with an embodiment of this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is based on digital radio technology. Specifically, the FWS 10 employs direct sequence spread spectrum based CDMA techniques over an air link to provide local access to subscribers, and offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective PN spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel,receiver 12d outputs a detect/not detect signal to the RBU controller 12e for indicating a detection of a transmission from one of the SUs 14, and also outputs a power estimate value $\chi$. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using El trunks and to its master antenna 12b using a coaxial cable. The SU 14 communicates with the RBU 12 via the radio interface, as described above.

Figure 2:
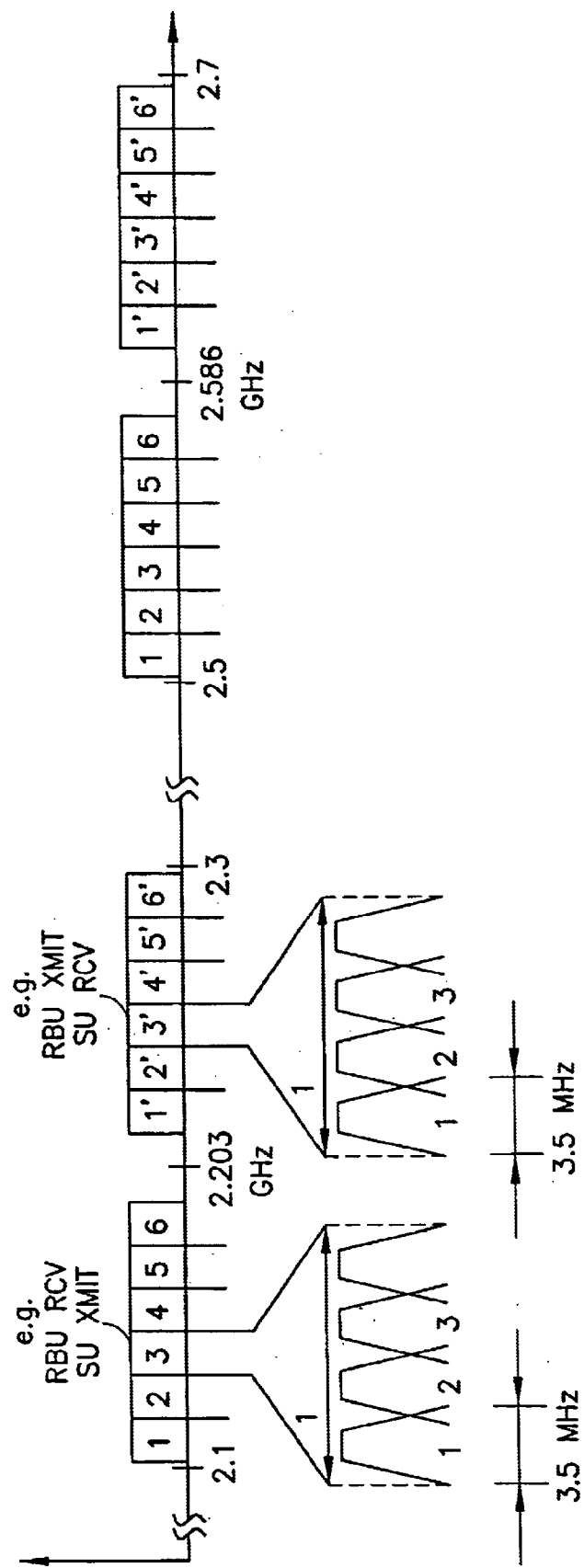
FIG. 2 is an exemplary frequency allocation diagram of the system of FIG. 1.

In the illustrated embodiment the SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 can be three to five times that of conventional CDMA systems primarily because the FWS 10 employs bi-directional Synchronous CDMA. The bi-directional synchronicity permits the FWS 10 to use near orthogonal spreading codes and gain maximum possible data carrying capacity.

Having thus described one suitable, but not limiting, technological environment wherein the teachings of this invention may be practiced, a description of the invention is now provided.

A stated object of this invention is to improve the performance and reliability of synchronous CDMA systems, such as the one described above with respect to FIGS. 1 and 2. The particular concerns addressed by this invention are (a) avoiding poor spectral properties associated with the Walsh codeset, (b) avoiding system degradation due to the existence of correlated data between users, and (c) avoiding the detrimental effects of one or more channels which may be asynchronous.

In accordance with a first aspect of this invention the spectral properties of the Walsh codeset are improved by re-ordering the columns of the Walsh codeset matrix.

In the Walsh codeset matrix (whether reordered in accordance with this invention or scrambled), one column is all ones. In the normal operation of the synchronous CDMA system some correlated data may occur (e.g., a synchronization pattern, a particular silence pattern from a voice encoder, etc.). To overcome this problem, and further in accordance with this invention, some of the rows of the Walsh matrix may be inverted. This prevents the all ones column from resulting in a large correlation peak in the composite signal, which may cause a problem in the presence of non-linear impairments (i.e. clipping).

Within the reordered Walsh set the codes have different auto-correlation and cross-correlation properties. In synchronous CDMA systems there may exist an asynchronous channel (e.g., the side channel) to synchronize users who are new to the system, or those that have lost synchronization, or there may be some channels which have a reasonable probability of operating as or becoming asynchronous. To account for this, it is desirable to create a Walsh codeset (whether reordered in accordance with this invention or scrambled) which contains a number of codewords in the set which have good auto-correlation and cross-correlation properties over all timing offsets.

An important aspect of this invention is in reordering the Walsh codeset as opposed to simply scrambling the Walsh codeset. As was described previously, scrambling the Walsh codeset is typically accomplished by generating another PN code (such as the above-referenced cover code) of the same length as the Walsh code, or a larger length, and then XOR'ing each code in the Walsh set with the cover code.

However, and in accordance with the teachings of this invention, reordering the Walsh codeset is accomplished by exchanging columns of the Walsh codeset matrix. This invention also teaches inverting one or more of the codewords in the codeword set to avoid degradation due to correlated data. This invention further teaches choosing PN codes for a synchronous CDMA system that allow for (or optimize) some subset of the CDMA channels to be asynchronous channels.

Through the reordering operation, in accordance with the teaching of this invention, the balanced properties of the Walsh codeset are maintained, and the number of +1's is equal to the number of −1's (or 0's) in each codeword (except for the all ones codeword). By inverting some of the codewords any degradation due to correlated data is reduced. Also, by allowing for asynchronous users the system becomes more robust and a greater flexibility is achieved.

Figures 3A, 3B, 3C, 6:
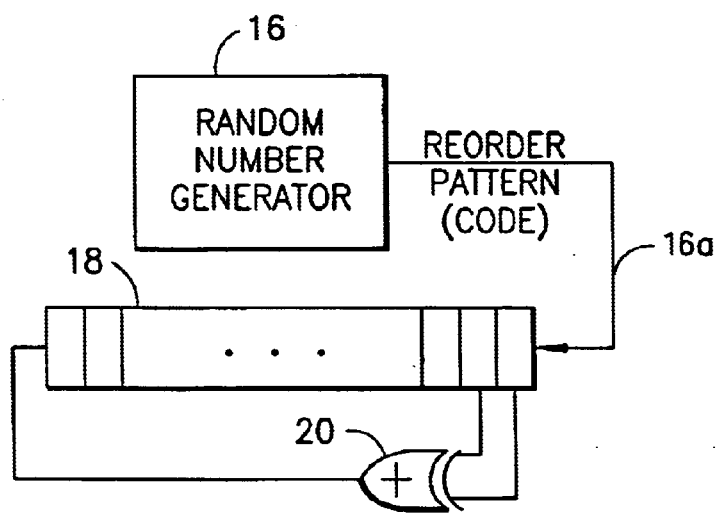
FIG. 3A illustrates an exemplary Hadamard (H) matrix.
FIG. 3B illustrates a Reordering Code (RC)
FIG. 3C illustrates a Reordered Hadamard (RH) code matrix in accordance with this invention.
FIG. 6 is a simplified block diagram of a reordering pattern or code generator and a shift register for reordering a PN code.

Describing the invention now in further detail, FIG. 3A illustrates an exemplary Hadamard matrix (treating a −1 as a 0). In this regard it is noted that corresponding values stored in a memory have binary values of 1 and 0. These bits are exclusive ORed to create a 0 or 1 chip value in each chip period. It is then assumed that in the subsequent modulation stage(s) the 0 and 1 values chips are remapped to −1 and +1 valued chips.

In accordance with this invention, reordered Hadamard codes are constructed by reordering the columns of the Hadamard matrix. For example, the Hadamard matrix (H) of FIG. 3A is reordered using the Reordering Code (RC) shown in FIG. 3B, and the resulting Reordered Hadamard (RH) code matrix is shown in FIG. 3C. Note that the third column has been moved to the first column position, and columns 1 and 2 have been shifted to the right by one column position.

In this case the Reordered Hadamard becomes a time shifted Hadamard with the codes renumbered. However, for Hadamards of order 8 or higher the reordering produces completely different codesets. To generate Reordering Codes, the states of an m-sequence generator can be lengthened by placing 128 at the end of the code. Randomly generated Reordering Codes can be employed as well. For example, FIG. 6 shows a block diagram of a random number generator 16 that outputs a Reordering Pattern or Code 16*a* to a shift register 18 having feedback through an XOR function 20.

Examining FIG. 3C it can readily be seen that one important advantage of the use of reordered Hadamard codes, in accordance with the teachings of this invention, is that all of the codes, except the all ones code, are perfectly balanced.

If all of the transmitted signals in the CDMA system need to be spread then it is apparent that the all-ones codeword should be discarded. This reduces the number of usable codes by one. However, and as was described above, some of the rows may be inverted to prevent the all ones column from resulting in a large peak in the composite signal.

The reordering code can be generated using any random or pseudorandom sequence generator as shown in FIG. 6. For example, a random sequence from 1 to N (where N is the length of the Walsh code, or less) is generated. Then each of the columns of the Walsh code is reordered according to its location in the reordering pattern or code sequence, as shown in FIG. 4.

Note that one could also reorder by moving column 1 (of the Walsh code) to 3, 2 to 5, and so on. However, if one carefully examines the example shown in FIG. 4 it will become apparent that the reordered code is not a time shifted version of the original Walsh code.

It is also important to note that the resultant codeset cannot be achieved by simply applying a cover code to the original Walsh codeset, since the only way to achieve the all ones codeword is to use one of the codes of the Walsh set as the cover code, and using one code of the Walsh set as a cover code simply renumbers the codewords.

Figure 5:
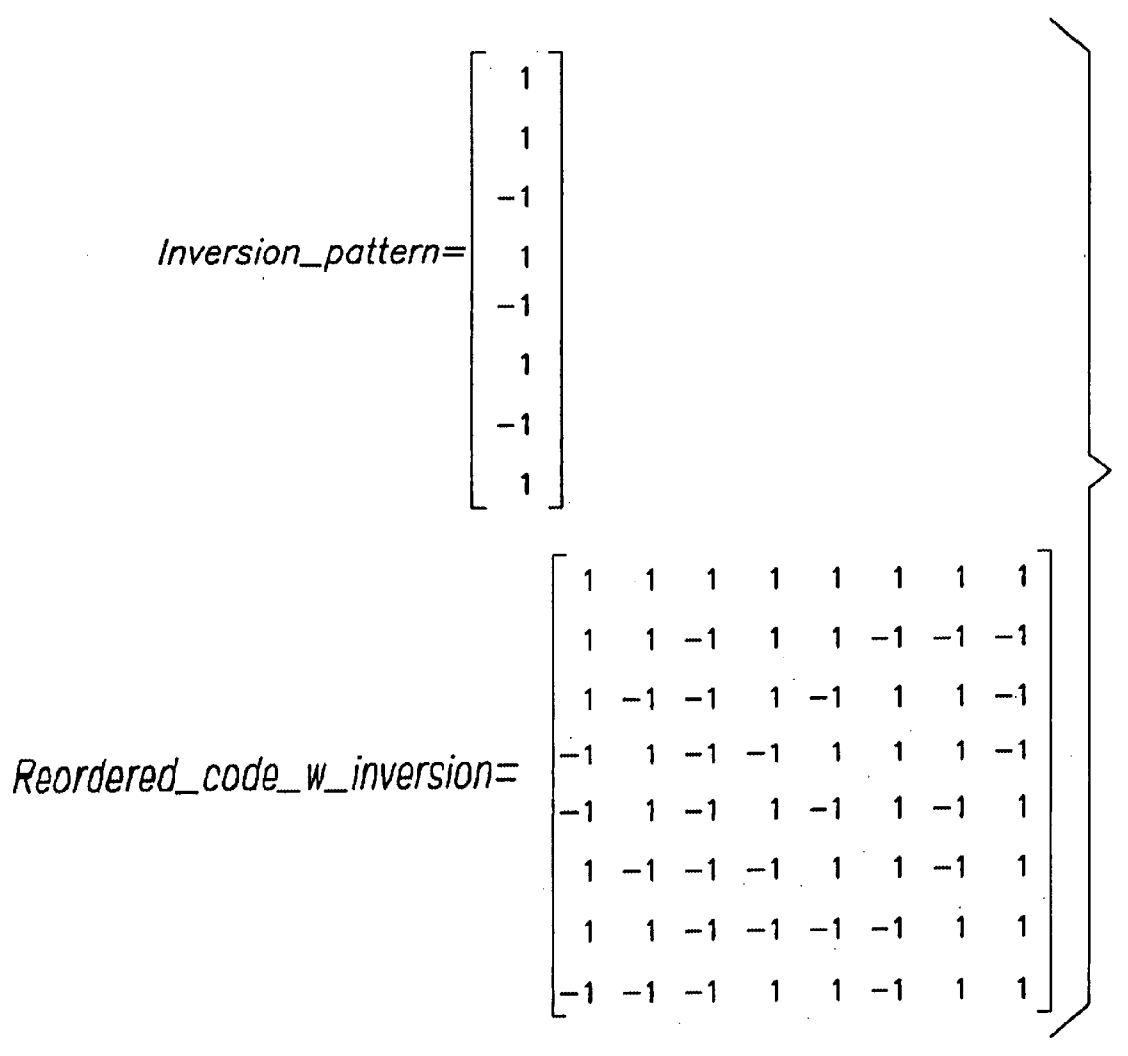

An important goal when inverting codewords is to provide a simple means to reduce the peak signal level when transmitting correlated data. Referring to FIG. 5, to invert codewords one first defines an inversion pattern. Then the inversion pattern is applied by multiplying each element in a row by its corresponding element in the inversion pattern. Thus row 1 in the reordered codeset is multiplied by row 1 in the inversion pattern, etc.

For a case where all of the channels in the system 10 may be transmitting the same data (e.g., a sync pattern at the beginning of a frame), the resulting waveform is the sum of each column of the codeset. For the reordered codeset it is assumed that all users are transmitting a 1 for the data and, therefore, one can sum each column to determine that the transmitted waveform is:

$$tx\_waveform_{reordered}\_code=[0\ 0\ 0\ 0\ 8\ 0\ 0\ 0].$$

Next, examine the same conditions for the reordered codeset, with inversion, and the results are as follows:

$$tx\_waveform\_reordered\_code\_w\_inversion=[2\ 2-6\ 2\ 2\ 2\ 2\ 2].$$

Note that while no attempt was made to optimize the example inversion code that was shown here, the peak of the transmitted signal is reduced from 8 to 6 (only the magnitude is of interest). While this case appears to give but a slight improvement, when operating with codesets of size 128 the peak can be reduced from 128 to approximately 75. This beneficially allows operation with correlated data without clipping.

It is expected that the RBU 12 of FIG. 1 will have an ability to generate the reordered (and possibly inverted) codes as shown in FIGS. 3A–3C, 4 and 5, and to then assign one or more reordered codes to a SU 14 that requires a code or codes to communicate with the system. For example, the RBU controller 12*e* may be responsible for generating and assigning the reordered codes. Alternatively, the codes may be reordered at another location and then simply assigned by the RBU controller 12*e* to requesting ones of the SUs 14.

While the invention has been particularly shown and described with respect to preferred embodiments thereof, it will be understood by those skilled in the art that changes in form and details may be made therein without departing from the scope and spirit of the invention.

What is claimed is:

1. A method for improving the spectral properties of a PN codeset for use in a synchronous CDMA communications system, comprising steps of:

providing a PN codeset matrix in a controller for a radio base unit capable of wireless communications with a plurality of subscriber units;

reordering the columns of the PN codeset matrix by exchanging columns in accordance with a reordering code to produce a reordered pseudonoise codeset having improved spectral properties, assigning individual ones of the reordered PN codeset to requesting ones of the subscriber units; and inverting at least one codeword of the reordered columns of the PN codeset matrix.

2. A method as in claim 1, and further comprising the step of selecting PN codes to optimize a subset of channels to operate in an asynchronous manner.

3. A synchronous CDMA communications system, comprising:

a radio base unit capable of bidirectional wireless communications with a plurality of subscriber units; and a controller for reordering columns of a Hadamard codeset matrix by exchanging columns in accordance with a predetermined reordering code to produce a reordered pseudonoise (PN) codeset having improved spectral properties, and for assigning individual ones of the reordered PN codeset to requesting ones of the subscriber units, wherein said controller further comprises means for inverting at least one codeword of the reordered PN codeset.

4. A method for improving the spectral properties of a Hadamard codeset for use in a synchronous CDMA communications system, comprising steps of:

providing a Hadamard codeset in a radio base unit capable of bidirectional wireless communications with a plurality of subscriber units;

reordering columns of the Hadamard codeset in a controller of the radio in accordance with a reordering code to generate a reordered Hadamard codeset; and inverting at least one codeword of the reordered Hadamard codeset.

5. A method as in claim 4, and further comprising the steps of defining an inversion pattern, and inverting at least one codeword of the reordered Hadamard codeset using the inversion pattern.

6. A method as in claim 4, and further comprising the step of selecting codes to optimize a subset of channels to operate in an asynchronous manner.

7. A method as in claim 4, and comprising a step of generating the reordering code using one of a random or pseudo-random number generator.

8. A method as in claim 5, wherein the step of inverting includes a step of multiplying each element in a row of the reordered Hadamard codeset by a corresponding element of the inversion pattern.

9. A method as in claim 5, wherein the reordered Hadamard codeset is an N row by M column matrix, and wherein the inversion pattern is a N row by one column matrix.

* * * * *